E. L. RIDDICK & D. MacK. MacLEOD.
VALVE.
APPLICATION FILED AUG. 12, 1911.

1,038,653.

Patented Sept. 17, 1912.

Witnesses
F. C. Barry

Inventors
Edgar L. Riddick
Donald M. K. MacLeod

By Victor J. Evans
Attorney

UNITED STATES PATENT OFFICE.

EDGAR L. RIDDICK AND DONALD MacKAY MacLEOD, OF LAKE CHARLES, LOUISIANA.

VALVE.

1,038,653.      Specification of Letters Patent.      Patented Sept. 17, 1912.

Application filed August 12, 1911. Serial No. 643,733.

*To all whom it may concern:*

Be it known that we, EDGAR L. RIDDICK and DONALD MACKAY MACLEOD, citizens of the United States, residing at Lake Charles, in the parish of Calcasieu and State of Louisiana, have invented new and useful Improvements in Valves, of which the following is a specification.

The invention relates to valves, and more particularly to the class of throttle valves.

The primary object of the invention is the provision of a valve in which fluid supply may be controlled and shut off at will, the valve being especially useful on steam engines, pipes, gas wells, oil wells, or the like, where it is desired to use a quick acting valve.

Another object of the invention is the provision of a valve which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
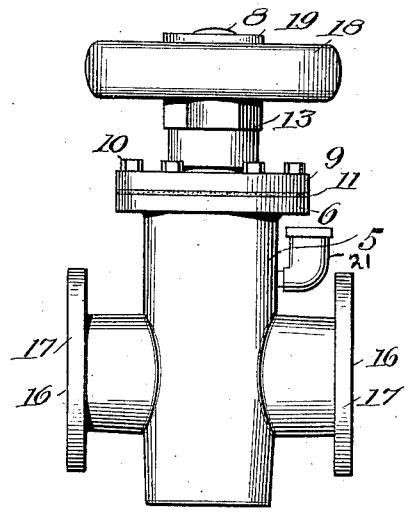
Figure 2:
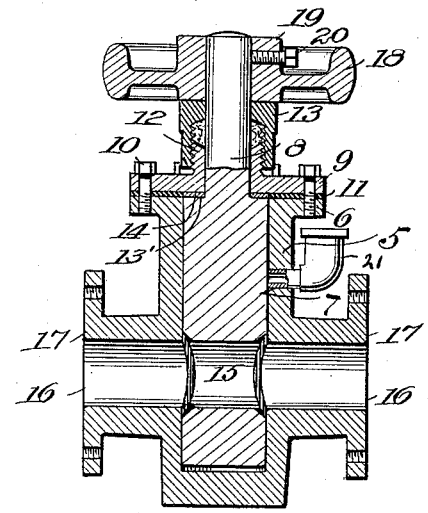
Figure 3:
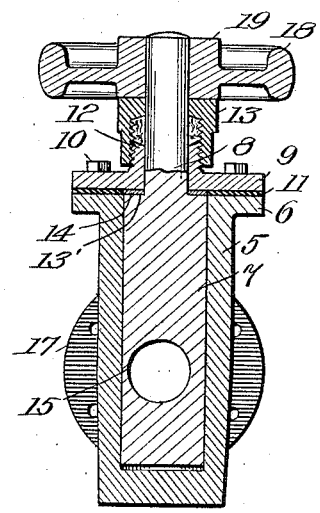
Figure 4:
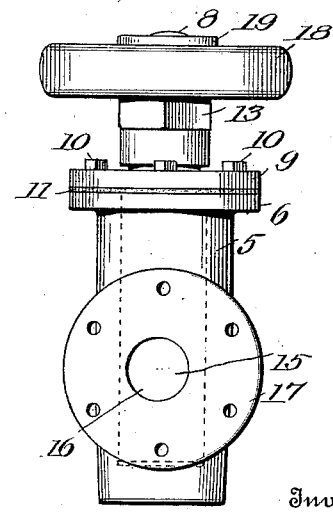

In the drawings: Figure 1 is a side elevation of a valve constructed in accordance with the invention. Fig. 2 is a vertical longitudinal sectional view thereof. Fig. 3 is a vertical transverse section. Fig. 4 is an end elevation.

Similar reference characters indicate corresponding parts throughout the several views of the drawings.

Referring to the drawings by numerals, the valve comprises a cylindrical-shaped casing 5, the same being closed at its bottom and open at its top, the top of the said casing being formed with an outturned annular flange 6 for the detachable connection thereto of a head, presently described.

Rotatably mounted within the casing 5 is a valve body 7, the same being formed with a reduced turning stem 8 at its upper end, which is surrounded by the removable disk-like head 9, the latter being secured to the flange 6 by means of a plurality of bolt members 10 passed through the head and said flange. Interposed between the head and the annular flange is a resilient gasket 11 which forms a fluid tight joint therebetween. The head, at its center, is formed with an externally threaded boss 12, the same being engaged by a stuffing box 13, thereby preventing leakage of fluid between the stem and the said head. The reduced upper end portion forming the stem 8 provides a bearing shoulder 13', the same supporting a washer 14 which surrounds the stem 8, in turn is surrounded by the gasket 11 and is adapted to take up wear between the valve body 7 and the said head.

Formed transversely in the valve body, slightly to one side of its axis of movement, is a circular shaped opening 15, which latter is adapted to alternately register and close branch coupling extensions 16 projecting at right angles from the casing 5 at opposite sides thereof, the said extensions being formed with outturned annular flanges 17, to which are adapted to be connected inlet and exhaust pipes, as usual. By reason of the fact that the opening 15 in the valve body 7 is located slightly to one side of its axis of movement, it provides a thickened wall at one side of the said opening, and a shallow wall at the opposite side, so that upon turning the valve body a quarter turn, the communication between the casing and the coupling extensions will be positively closed, thereby shutting off the supply of fluid through the valve casing.

Mounted upon the upper end of the stem 8 is a turning wheel 18, the hub 19 of which is fixed thereto by means of a set screw 20, which is threaded in the hub and engages in the stem. Thus, the valve body may be turned for opening and closing the valve casing, and in operating the wheel, it is only necessary to rotate the same a quarter turn to either open or close the valve.

Suitably mounted upon the casing 5 and in communication therewith is an oil cup 21 which supplies oil to the turning valve.

What is claimed is:

A valve comprising a casing having an annular flange at the upper end thereof, a valve body rotatably mounted in the casing and having a transverse circular opening arranged at one side of its axis of rotation, a removable head closing the upper end of the valve casing, a resilient gasket interposed between said head and said annular flange, a stem formed on the valve body and extending upwardly through said head, a washer surrounding said stem at its junction with said valve body, said washer being surrounded by said gasket, a packing gland connected with said head and surrounding said valve stem, coupling extensions formed at the opposite sides of said valve casing and having passages in alinement with the opening in said valve body, and means secured to said valve stem for rotating the same.

In testimony whereof we affix our signatures in presence of two witnesses.

EDGAR L. RIDDICK.
DONALD MacKAY MacLEOD.

Witnesses:
U. A. BELL,
E. R. PRICE.

Copies of this patent may be obtained for five cents each, by addressing the " Commissioner of Patents, Washington, D. C."